United States Patent [19]

Moriwaki et al.

[11] Patent Number: 5,010,213

[45] Date of Patent: Apr. 23, 1991

[54] SIGNAL INPUT SHEET

[75] Inventors: Masafumi Moriwaki, Yamanashi; Shigeaki Sano, Fuchu; Katsunori Hatakeyama, Koganei; Hiroshi Yamada, Koganei; Youzou Nouno, Koganei, all of Japan

[73] Assignee: Toppan Moore Company, Ltd., Tokyo, Japan.

[21] Appl. No.: 457,401

[22] Filed: Dec. 27, 1989

[30] Foreign Application Priority Data

Dec. 29, 1988 [JP] Japan .................................. 63-335494

[51] Int. Cl.⁵ .............................................. G08C 21/00
[52] U.S. Cl. ................................................................ 178/18
[58] Field of Search ........................................... 178/18, 19

[56] References Cited

U.S. PATENT DOCUMENTS

| | | | |
|---|---|---|---|
| 4,636,582 | 1/1987 | Moriwaki et al. | 178/18 |
| 4,801,771 | 1/1989 | Mizuguchi et al. | 178/18 |

FOREIGN PATENT DOCUMENTS

| | | |
|---|---|---|
| 60-51928 | 3/1985 | Japan . |
| 61-43332 | 1/1986 | Japan . |
| 62-139027 | 6/1987 | Japan . |
| 64-36323 | 2/1989 | Japan . |

Primary Examiner—Stafford D. Schreyer
Attorney, Agent, or Firm—Kenyon & Kenyon

[57] ABSTRACT

A signal input sheet having a flexible upper laminate and a lower laminate. The upper laminate includes either a conductive layer or a resistive layer on its lower surface as a first layer and at least one hand-written input area and at least one binary data input area on its upper surface. The lower laminate includes either a conductive layer or a resistance layer on its upper surface as a second layer, however, at least one of the first and second layer is formed as a resistive layer. Elastic insulative spacers are interposed between the first layer of the upper laminate and the second layer of the lower laminate. The spacers are arranged at desired intervals to allow the first layer to come in contact with the second layer when pressure is applied to the upper laminate from the outside. The spacing between adjacent insulative spacers is larger in the binary input area than the hand-written input area. Also, the insulative spacers are wider in the binary data input area as opposed to the hand-written input area. Means are provided for applying a voltage between the upper and lower laminates. In addition, means are provided for detecting at what position the force is applied from the outside.

5 Claims, 3 Drawing Sheets

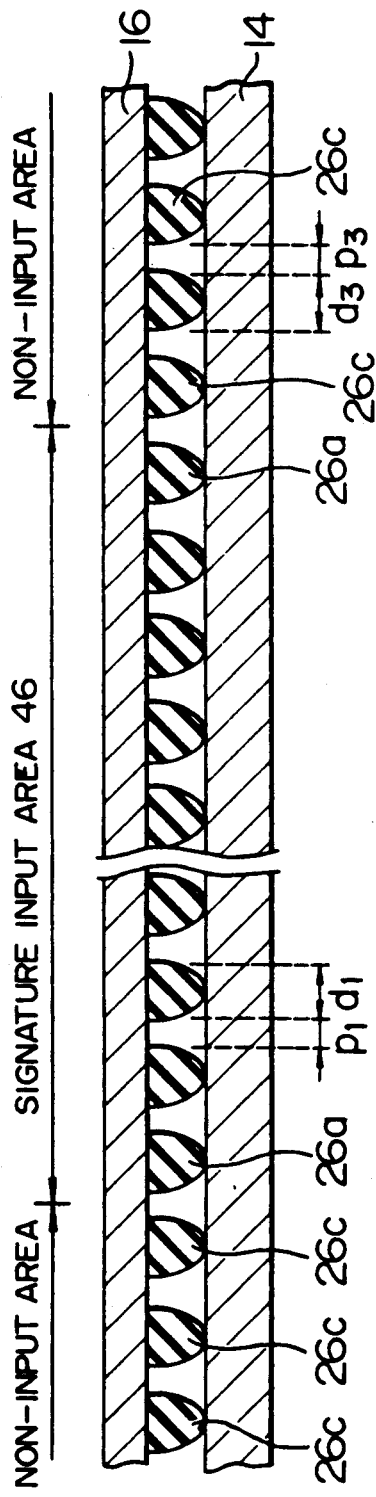
FIG. IA
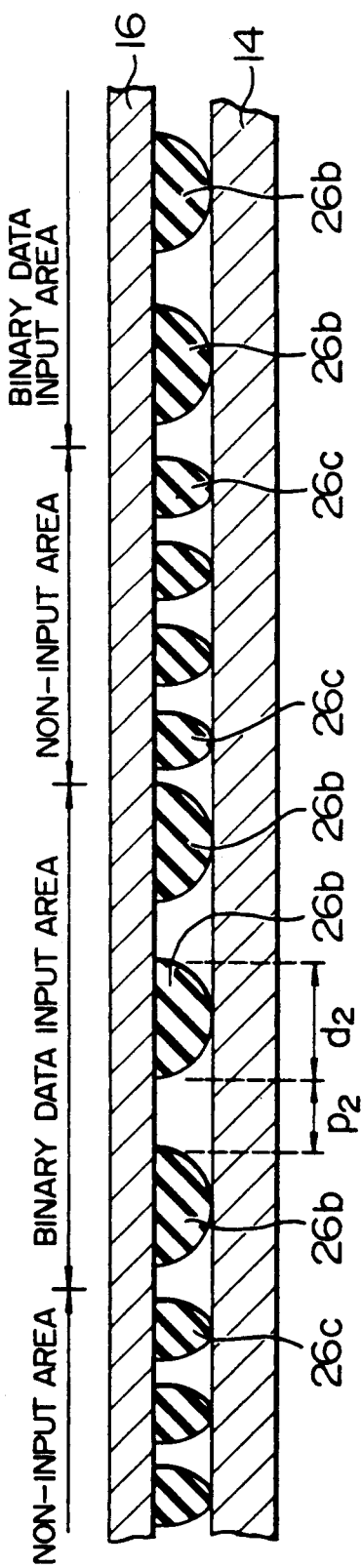
FIG. IB

SIGNAL INPUT SHEET

CROSS-REFERENCE TO RELATED APPLICATION

The present application relates to subject matter described in application Ser. No. 226,281 filed July 28, 1988 entitled "Information Input Sheet" by Masafumi Moriwaki, Shigeaki Sano, and Eiichi Tanaka, and assigned to the assignee of the present application.

BACKGROUND OF THE INVENTION

The present invention relates to a signal input sheet to output a signal indicative of the position of a pressure applied onto the sheet surface in accordance with the pressure.

Such a signal input sheet has been well known by, for instance, JP-A-60-51928 and JP-A-61-43332. FIG. 2 is a cross sectional view of a fundamental construction of such a signal input sheet. A signal input sheet 10 comprises a lower laminate 10A and an upper laminate 10B having a flexibility. The lower laminate 10A has a structure in which a rigid base plate 11 made of aluminum or the like, an insulative board 12 made of a phenol resin, a glass epoxy resin, or the like, and a resistance layer 14 having a predetermined resistance ratio are laminated. On the other hand, the upper laminate 10B has a structure in which a conductive layer 16, a rubber-like elastic layer 18 having a flexibility, a shielding layer 20 to eliminate static electricity from the hand of a user or noises from the outside, a printed layer 22 on which a print for a predetermined display was executed, and a transparent protective layer 24 are laminated in the direction from the lower side to the upper side. The elastic layer 18 is made of, for instance, elastomer. The conductive layer 16 is formed by thinly coating a conductive ink onto the elastic layer 18.

Dot-shaped insulative spacers 26 are adhered onto the lower surface of the upper laminate 10B so as to allow the conductive layer 18 to be away from the resistance layer 14 by a predetermined distance, thereby always keeping the conductive layer 16 and the resistance layer 14 in an electrically contactless state. A number of insulative spacers 26 are arranged on the lower surface of the conductive layer 16 in a form like a mesh or dots as shown in FIG. 3. The insulative spacers 26 have an elasticity such that they are easily deformed and recovered by a predetermined pressure or more, namely, by an ordinary hand-writing pressure.

When a pressure is applied from the surface of the transparent protective layer 24 to the upper laminate 10B by using a pen or the like, the upper laminate 10B becomes depressed in the pressurized portion. Thus, several insulative spacers 26 existing at a location corresponding to the pressurized position are also deformed and the conductive layer 16 is come into electrical contact with the resistance layer 14. Therefore, when a predetermined voltage $V_{cc}$ has previously been applied between the conductive layer 16 and the resistance layer 14, a current at the time of the electrical connection of the conductive layer 16 and the resistance layer 14, that is, a resistance value of the portion of the resistance layer 14 can be known from the voltage drop of a resistor R. Since such a resistance value corresponds to the pressurized position, X-Y coordinate signals of the pressurized position can be obtained. The upper laminate 10B is obviously recovered to the original state by releasing the hand-writing pressure.

By using the signal input sheet of the above conventional example to a signal input apparatus, hand-written information, for instance, hand-written characters of figures can be inputted. The signal input sheet is a flat plate and can be cheaply manufactured. On the other hand, as compared with an ordinary keyboard device using mechanical switches, the stable operating characteristics which are difficult to be influenced by the external environment are obtained. Therefore, it is expected that such a signal input sheet is applied to a simple data input terminal.

In the above two conventional techniques, the insulative spacers are arranged at regular intervals and the whole input sheet can respond at an equal sensitivity for an input pressure applied from the outside.

In such an input sheet, in addition to the input means by the hand-writing pressure, alphabet keys or KATAKANA character keys, a ten-key, other various command keys, and work content keys are also provided. Since those keys are based on the input of what is called binary data of ON/OFF, the sensitive conditions by the input largely differ from those by the input due to the hand-writing pressure.

SUMMARY OF THE INVENTION

It is an object of the present invention to provide a signal input sheet which can accurately respond to both of binary data by the pressure due to a key depression and hand-written input data due to a hand-writing pressure.

According to the invention, in such a signal input sheet as mentioned above, insulative spacers in a hand-written figure input area are arranged so as to be finely distributed than a distribution state of the insulative spacers in a binary data input area.

In the signal input sheet, signal input response characteristics according to the characteristics of the input data in the binary data input area and hand-written figure input area can be obtained. That is, in the hand-written figure input area, a position signal which follows the movement of a pen tip can be derived. It is sufficient to merely construct in a manner such that only the presence or absence of the pressure which is applied by a finger or pen tip or the like can be effectively detected from the binary data input area.

BRIEF DESCRIPTION OF THE DRAWINGS

FIGS. 1A and 1B are fundamental cross sectional views of characteristic portions in an embodiment of the present invention;

DESCRIPTION OF THE PREFERRED EMBODIMENTS

An embodiment of the present invention will be described hereinbelow with reference to the drawings.

Figure 4:
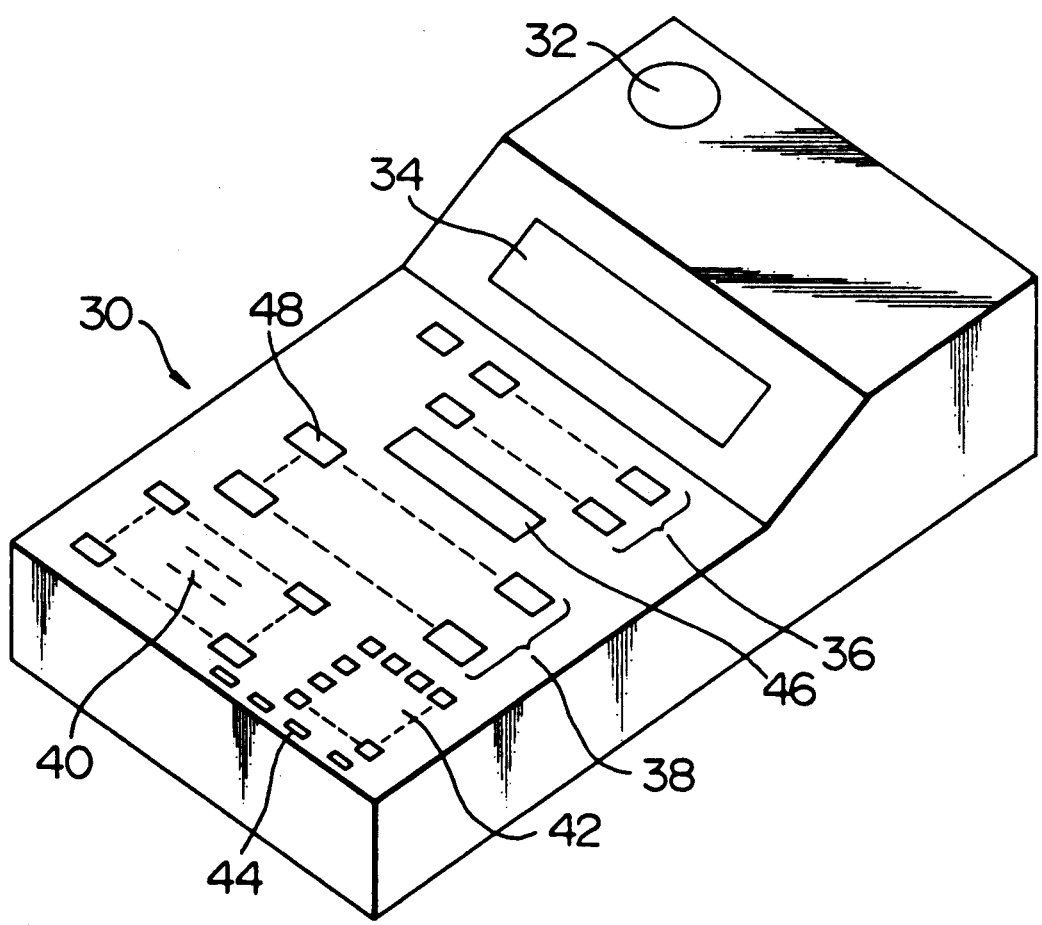
FIG. 4 is an external perspective view of a handy terminal apparatus using a signal input sheet of the invention.

FIG. 4 is an external perspective view of a handy terminal apparatus using a signal input sheet of the invention. In a terminal apparatus 30, reference numeral 32 denotes an acoustic coupler to communicate with the outside; 34 indicates an LCD display device; 36 and 38 represent special code input sections to input a content of a special work or an operation command to the apparatus 30; 40 alphabet keys; 42 a ten-key; 44 arrow keys; and 46 a signature input area in which hand-written data is to be inputted. One of the keys in the special code input section 38 is a signature key 48 to inform the start and end of the signature input to the apparatus 30. The signature input area 46 corresponds to the hand-written figure data input section and the other areas 36, 38, 40, 42, and 44 correspond to the binary data input section.

Figure 2:
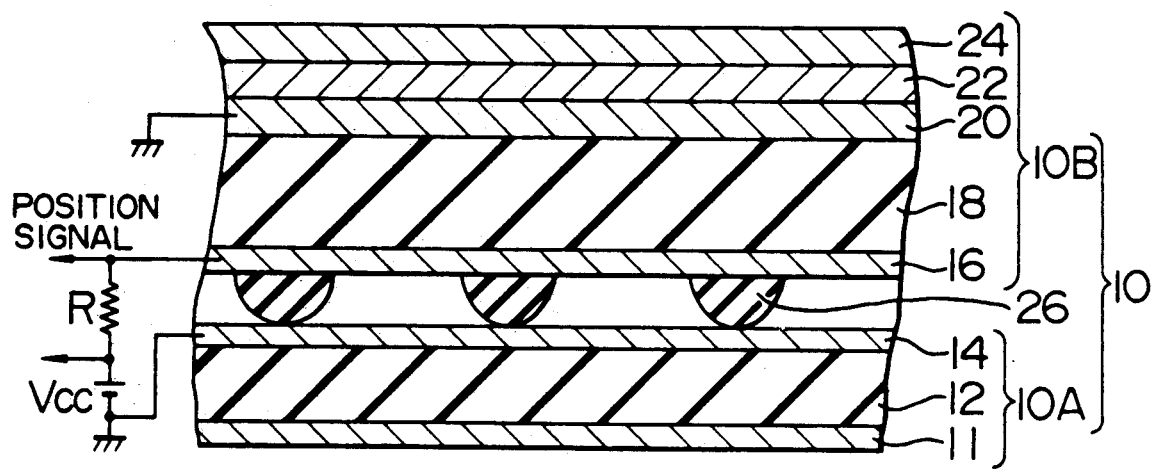
FIG. 2 is a cross sectional view showing a fundamental construction of a conventional example and of an embodiment of the invention.
Figure 3:
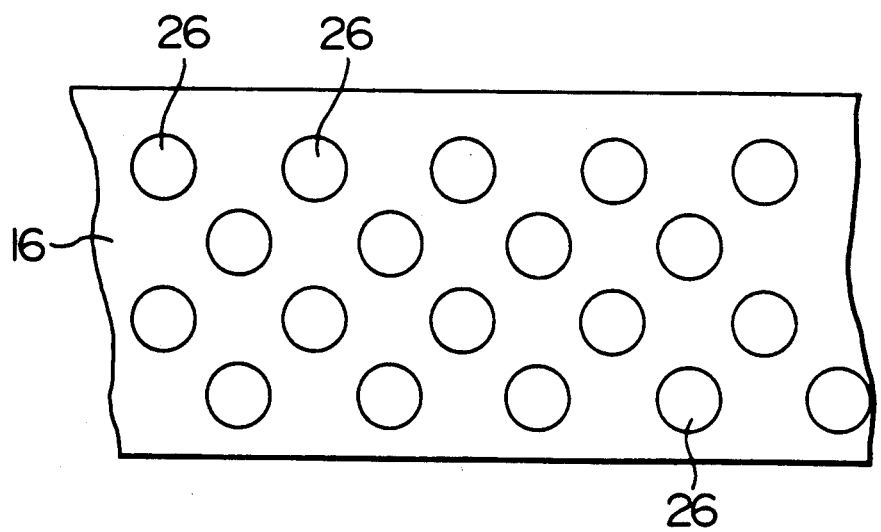
FIG. 3 is a plan view showing a conventional arrangement of insulative spacers.

To input binary data, in the case where a pressure is applied to a predetermined input area portion, in order to make it possible to certainly respond to such a state, it is preferable to arrange the insulative spacers 26 at a proper extend of roughness. On the other hand, in order to input hand-written figure information such as a signature or the like, it is necessary that the position of a pressure pen can be finely detected so as to trace the movement of the pen. Therefore, as a signal input sheet which is used to the apparatus 30 in FIG. 4, Fundamentally, the laminate structure shown in FIG. 2 is used. In the embodiment, pitches, sizes, and the like of the insulative spacers 26 are changed in each key input section, the signature input area, and the other non-input sections. FIG. 1 is a cross sectional view of the conductive layer and insulative spacers of the signal input sheet. FIG. 1A shows a cross sectional view of the signature input area. FIG. 1B shows a cross sectional view of the key input section in the special code input section.

In the signature input area 46, the hand-writing pressure position must be finely continuously read out so as to follow the movement of the pen tip upon hand-writing. In addition, it is desirable to obtain the electric connection even by a light touch. Therefore, a distance $p_1$ between the edge portions of insulative spacers $26a$ and a size (or width) $d_1$ of each insulative spacer $26a$ are set to slightly small values. On the other hand, in the portion of the binary data input keys shown in FIG. 1B, it is necessary that such a portion can respond to the pressure due to the depression by a finger whose pressure is weaker than the hand-writing pressure and whose depression area is larger than that. For this purpose, a distance $p_2$ between the edge portions of insulative spacers $26b$ is preferably set to be rough to a certain extent. Therefore, a size $d_2$ of each insulative spacer $26b$ is also set to be large to such an extent that the conductive layer 16 does not unnecessarily come into contact with the resistance layer 14. On the other hand, the non-input portions must be constructed so as not to respond to an unnecessary hand-writing pressure or a situation such that the portion of the palm of the hand is put on the input sheet to write a signature or the like. Therefore, insulative spacers $26c$ are arranged at a distance $p_3$ between the edge portions of the insulative spacers $26c$ which is equal to or shorter than the distance $p_1$ in the signature input area 46. In the example shown in the diagram, the distance $p_3$ in the non-input portion is the equal to the distance $p_1$ in the signature input area 46. The insulative spacers $26c$ can be also obviously interposed on the whole surface between the conductive layer 16 and the resistance layer 14 without a gap.

The insulative spacers 26 ($26a$, $26b$, $26c$) are adhered to the conductive layer 16 by, for instance, a screen printing method so as to obtain a density distribution which has already been described above. The insulative spacers 26 may have a dot or mesh shape. In the case of the dot-shape, its bottom surface shape is not limited to a circular shape but can be also set to a rectangle, a square, a triangle, or the like. The dots of the insulative spacers 26 are not limited to a regular arrangement but may be a random arrangement pattern.

For instance, when an interval h between the conductive layer 16 and the resistance layer 14 is set to about 0.2 mm, the distance $p_1$ between the edge portions of the insulative spacers $26a$ in the signature input area 46 is seto to about 200 to 500 μm and the size $d_1$ of each insulative spacer $26a$ is set to about 200 to 500 μm. The distance $p_2$ between the edge portions of the insulative spacers $26b$ in the binary data input portion is set to about 600 to 1000 μm and the size $d_2$ each insulative spacer $26b$ is set to about 600 to 2000 μm. The distance $p_3$ between the edge portions of the insulative spacers $26c$ in the non-input section is set to a value such that the input sheet does not respond to the finger tip and, practically speaking, it is set to be almost equal to that in the signature input area 46.

Various kinds of plastic materials can be used as a material of the rubber-like elastic layer 18. As a material of the conductive layer 16, it is possible to use a conductive ink in which a powder such as gold, silver, copper, nickel, carbon, etc. is dissolved by using a material which can be easily adhered to the elastic layer 18 as a solvent. On the other hand, the conductive layer 16 can be coated onto the whole lower surface of the elastic layer 18 or may be also selectively coated to only the input area.

Explanation has been made as if the same material was used as a material of the insulative spacers 26 ($26a$, $26b$, $26c$). However, they can be also changed in accordance with the positions. For instance, in the binary data input portion, it is sufficient to detect the presence or absence of the hand-writing pressure by the pen and the detection of the absolute position is not so important. Therefore, upon pressurization, even if insulative spacers $26b$ are deformed and the conductive layer 16 is electrically come into contact with the resistance layer 14 at a position which is slightly deviated in the lateral direction, no reading error occurs. However, in the signature input area 46, a figure to be written (namely, a signature pattern) needs to be read as accurately as possible and it is unpreferable that the electric connecting point is deviated in the lateral direction by the insulative spacer $26a$ when the pen tip is depressed onto the sheet. Therefore, it is desirable that a size d, a distance p between the edge portions, and a material of the insulative spacer $26a$ in the signature input area 46 are set such that the spacer $26a$ is difficult to be deformed in the lateral direction as compared with the insulative spacer $26b$ of the binary input portion.

On the other hand, explanation has been made as if all of the heights h of the insulative spacers $26a$, $26b$, and $26c$ were the same. However, they can be set to different values every area. The use feelings of the signature input area 46 and the binary data input portion can be also adjusted by the heights h of the insulative spacers $26a$, $26b$, and $26c$.

In the above embodiments, the insulative spacers 26 have been adhered to the conductive layer 16. However, it is also apparent to adhere them to the resistance layer 14.

We claim:

1. A signal input sheet comprising:

a flexible upper laminate having a lower surface and an upper surface, said upper laminate having one of a conductive layer and a resistive layer on its lower surface as a first layer, said upper surface of the upper laminate being divided into at least one hand-written input area for the input of characters and lines and at least one binary data input area for the input of single depressions;

a lower laminate having a lower surface and an upper surface, said lower laminate having one of a conductive layer and a resistive layer on its upper surface as a second layer, where said first layer faces said second layer and at least one of said first layer and said second layer being formed as a resistance layer;

a plurality of insulative spacers interposed between said first layer and said second layer, said insulative spacers arranged at intervals such as to allow an electrical connection between said first layer and said second layer, where a depressing pressure on the upper surface of said upper laminate causes the electrical connection between said first layer and said second layer, said insulative spacers having a larger width in said binary data input area and having a larger spacing between adjacent insulative spacers in said binary data input area;

a voltage source coupled between said first layer and said second layer; and means for detecting a position at which said depressing pressure is applied on the upper surface of said upper laminate.

2. A sheet according to claim 1, wherein said upper laminate further has a non-input area which does not sense an input.

3. A sheet according to claim 2, wherein the distribution of the insulative spacers on the lower side of the non-input area is equal to or finer than the distribution of the insulative spacers on the lower side of the hand-written input area.

4. A sheet according to claim 1, wherein the insulative spacers are respectively independently formed from the other.

5. A sheet according to claim 4, wherein each of the insulative spacers on the lower side of the binary data input area has a shape larger than a shape of each of the insulative spacers on the lower side of the hand-written input area.

* * * * *